3,440,950
SMOKEHOUSE CONTROL SYSTEM
Le Roy G. Moskal, Lodi, Wis., assignor to Alkar Engineering Corporation, Lodi, Wis., a corporation of Wisconsin
Filed Apr. 20, 1966, Ser. No. 544,011
Int. Cl. G05d 21/02; F23n 5/20
U.S. Cl. 99—259                        10 Claims

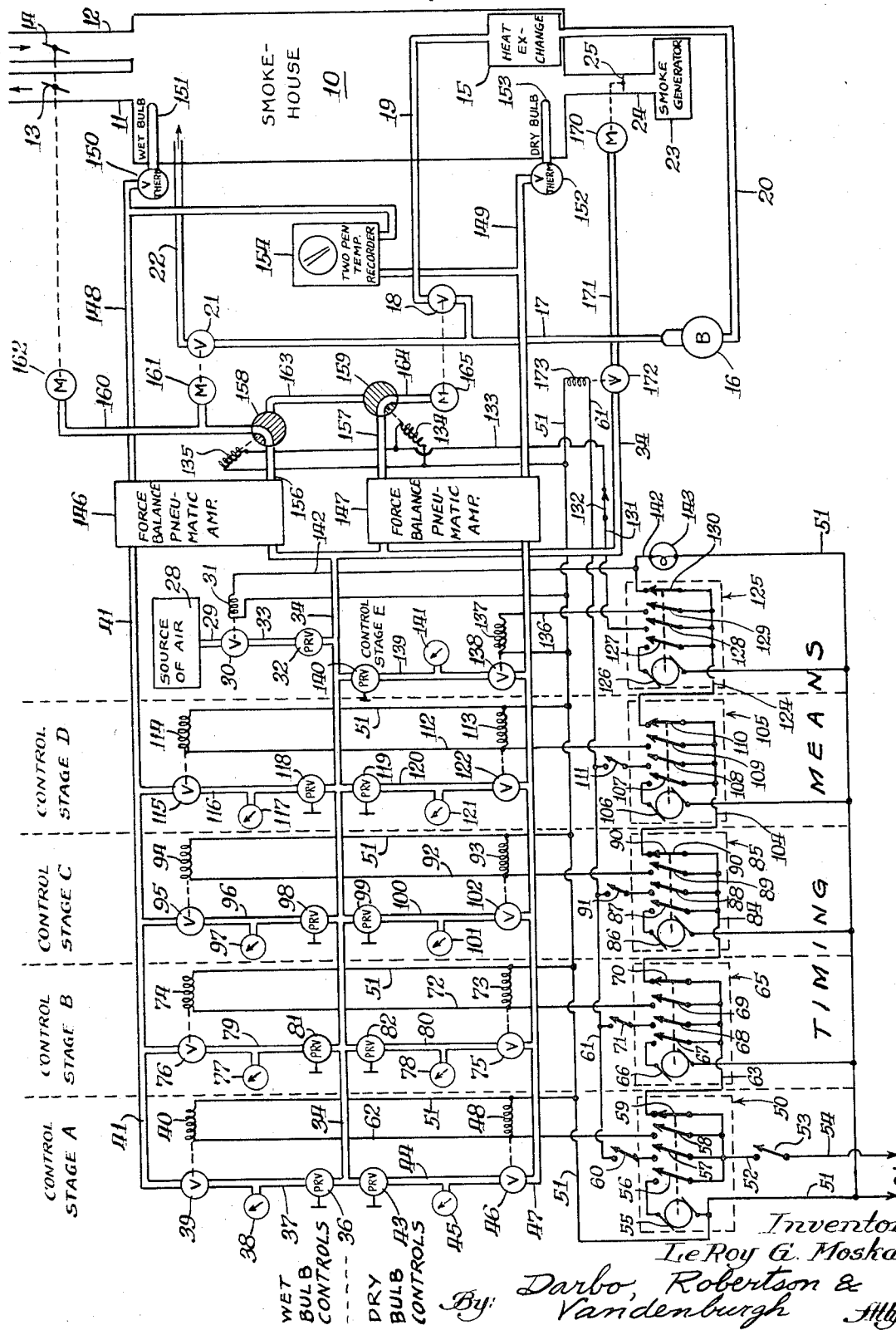

ABSTRACT OF THE DISCLOSURE

There are a plurality of penumatic control stations, i.e., set points, in two sets, one set being for a wet bulb control and the other set being for a dry bulb control. These control stages each are operative for periods of time determined by electric timers with each subsequent control stage being activated when the timer of the preceding control stage runs out. Each set is connected to a force balance pneumatic amplifier which compares the pneumatic input signal from the control stages with an input signal from wet and dry bulbs, respectively, located in the smokehouse. The force balance pneumatic amplifiers control the temperature and humidity in the smokehouse by the operation of a series of motor driven valves.

---

The present invention relates to an automatic control apparatus for use with a food smokehouse, and the following disclosure therdeof is offered for public dissemination upon the grant of a patent therefor.

Many foods, e.g., hams, bacon, sausage, fish, etc., are processed in a smokehouse. Usually this processing involves both a cooking and a smoking operation. The details of just what is done as to temperature vs. time vs. smoking vs. humidity, etc., will vary with the type of product (that is whether it is ham, bacon, etc.) as well as the preferences of the particular processor. As a matter of fact, it is quite common to find that even a single processor will not use the same conditions for all hams processed, or all slabs of bacon processed, etc., but will vary his processing conditions from time to time, even day to day.

Historically the processing conditions were determined by a smokehouse operator who would supervise the running of the smokehouse and would adjust various controls (e.g., valves) as the smoking process proceeded during each run of the smokehouse to cause the conditions in the smokehouse to change in the manner that he believed to be best. This required the constant supervision of a skilled, experienced man and not the least of the disadvantages was the labor cost involved. Another recognized disadvantage was that the processing conditions varied from time to time, thus there was a recognized disuniformity between the product produced one day and the product produced the next.

To the extent that automatic control devices are presently available commercially, they have the disadvantage that they do not provide sufficient flexibility to enable a processor to establish all of the different sets of conditions for the various uses of a smokehouse. In some devices this is due to a lack of control over all of the parameters or conditions that are significant to smokehouse operation. Not all devices make provision for increases in the processing temperature, but those commercial devices that do utilize a cam actuated control for this purpose. A cam actuated control provides little flexibility because of the necessity for cutting a different cam to accommodate each type of temperature increase desired. In contrast the present invention controls all of the factors that are significant to normal smokehouse operation, and provides an almost unlimited ability to change the operating conditions as desired. At the same time the identical conditions may be duplicated from one smokehouse run to the next (or even a week later) without any difficulty whatsoever.

Further objects and advantages will become apparent from the following description taken in conjunction with the drawing, which is a schematic illustration of an embodiment of the invention employed in conjunction with a smokehouse.

Although the following disclosure offered for public dissemination is detailed to ensure adequacy and aid understanding, this is not intended to prejudice that purpose of a patent which is to cover each new invention concept therein no matter how others may later disguise it by variations in form or additions or further improvements. The claims at the end hereof are intended as the chief aid toward this purpose; as it is these that meet the requirement of pointing out the parts, improvements, or combinations in which the inventive concepts are found.

The drawing illustrates a smokehouse 10 which is used for the processing of food products. It includes provision for exhausting air therefrom through duct 11 and for supplying fresh air thereto through duct 12. The flow of air through ducts 11 and 12 is controlled by dampers 13 and 14 respectively. Heat is supplied to the smokehouse by a heat exchanger 15. Heat exchanger 15 is heated by steam from a boiler 16, the heat flowing from the boiler to the exchanger through pipe 17, valve 18, and pipe 19. Pipe 20 is a condensate return pipe from the heat exchanger to the boiler. The use of a steam supplied heat exchanger is merely illustrative and other means for supplying heat, such as a gas fired burner, discharging its products of combustion directly into the smokehouse or sending the heat through a heat exchanger could be employed alternatively. Pipe 17 also leads to a valve 21. A pipe 22 from valve 21 discharges directly into the smokehouse so that steam may be released into the smokehouse for raising the humidity therein. A smoke generator 23 communicates with the smokehouse through a duct 24. The flow through duct 24 is controlled by a damper 25.

It is to be emphasized that the drawing is merely schematic. No inferences are to be drawn from the relative location of the parts with respect to each other and to the smokehouse. Their positioning in the drawing was dictated solely by convenience and clarity of illustration.

The control apparatus comprises a successive series of control stages. In the drawing these control stages have been designated control stage A through E respectively. The control primarily is maintained pneumatically except that electric timers are employed. While electrical or electronic controls could be substituted for the pneumatic controls, as will be apparent to those skilled in the control art, there is a substantial advantage in my mind in the use of pneumatic controls for smokehouse operation. One of the significant reasons therefor is that the main elements of such controls are of a mechanical nature, more familiar to the maintenance men in meat processing plants. Electrical items are not particularly suited to trouble-free operation under the conditions present in the usual processing plant. Additionally, the piping, e.g., copper tubing, required for pneumatic controls is easily run from a remote location at which a control panel is located to specific valves or motors on or in conjunction with the smokehouse. This is significant in comparison with capillary tube type apparatus.

The air for the pneumatic controls is supplied from a source 28 through a pipe 29 leading to a valve 30. Valve 30 is actuated by a solenoid 31. From valve 30 air travels to a pressure regulating valve 32 through a pipe 33. From pressure regulating valve 32 the air is delivered to a main air supply pipe or header 34.

Control stage A comprises an adjustable pressure regulating valve 36 connected to air supply pipe 34. A pipe 37 connects valve 36 with a pressure actuated gauge 38 and a valve 39 operated by a solenoid 40. Valve 39 also connects to an air indicator line 41. On the dry bulb side is an adjustable regulating valve 43 connected between pipes 34 and 44. Pipe 44 connects to a gauge 45 and a valve 46. Valve 46 also communicates with air indicator line 47 and its operation is controlled by solenoid 48.

A timer, generally 50, forms a part of control stage A, and is connected to the source of electrical power through wire 51 and wire 52, starting switch 53, and wire 54. Timer 50 includes a synchronous motor 55, three normally open switches 56, 57 and 58, and a normally closed switch 59. All of the switches being operated by motor 55. Timer 50 (as is the case with the timers of the remaining stages) is of a type that may be preset for running a length of time, which length of time is determined by the setting. When the timer is set all of switches 56–59 change position and remain in the changed position until the timer has run back to zero. Upon zero being reached all of the switches 56–59 return to their illustrated position. Switch 56 is the one that controls the operation of motor 55. Thus, when the timer has been set to run for a selected period of time, say 5 minutes, switch 56 is closed by reason of that setting, and if starting switch 53 is closed, motor 55 will run for a period of 5 minutes at which time switch 56 opens (and the remaining switches return to their illustrated position).

A smoke control switch, switch 60, is connected between switch 57 and wire 61. A wire 62 connects switch 58 to one side of solenoids 40 and 48, the other side of the solenoids being connected to wire 51. A wire 63 acts as a supply wire from switch 59 to the timer, generally 65, of control stage B.

Control stage B generally corresponds to the structure of control stage A, just described. Thus, timer 65 includes a motor 66 and four switches 67–70. A smoke control switch 71 is connected between switch 68 and wire 61. A wire 72 connects switch 69 to solenoids 73 and 74 of valves 75 and 76 respectively. There are pressure gauges 77 and 78 which read the pressure in pipes 79 and 80 respectively. The pressure in these two pipes is controlled by the setting of pressure regulating valves 81 and 82 respectively.

Control stage C includes a timer, generally 85, which is supplied by power through a wire 84 connected to switch 70. The timer includes a motor 86 and four switches 87–90. There is a smoke switch 91 and a wire 92 leading to solenoids 93 and 94. In the pneumatic portion there are valve 95, pipe 96, gauge 97, regulating valve 98, regulating valve 99, pipe 100, gauge 101, and valve 102. The timer, generally 105, of control stage D is connected by a wire 104 to switch 90 of timer 85. Timer 105 includes a motor 106 and switches 107–110. There is a smoke switch 111 and a wire 112 connected to solenoids 113 and 114. The other parts of control stage D include valve 115, pipe 116, gauge 117, valve 118, valve 119, pipe 120, gauge 121, and valve 122.

Control stage E is generally similar to the remaining control stages but includes only half the pneumatic controls of the other stages. It comprises a timer, generally 125, supplied with power through a wire 124. Timer 125 includes a motor 126 and four switches 127–130. Switch 127 is connected to control the operation of motor 126 as was switch 56 of timer 50. Switch 128 is connected by a wire 131, a switch 132, and wire 133 to solenoids 134 and 135. The other side of the two solenoids 134 and 135 are connected to wire 51. Switch 129 is connected by a wire 136 to solenoid 137 of valve 138. A pipe 139 connects to valve 138, valve 140 and gauge 141. The wire 142 connects switch 130 to solenoid 31 and to an indicating light 143. The other sides of the solenoid and light are connected to wire 51.

Pipes (indicator lines) 41 and 47 are respectively connected to force balance pneumatic amplifiers 146 and 147, as are air pressure indicator lines 148 and 149. Indicator line or pipe 148 is connected to valve 150 controlled by a wet bulb 151. Line 149 connects to a valve 152 controlled by a dry bulb 153. Lines 148 and 149 also connect to a two-pen temperature recorder 154.

Air is supplied to amplifiers 146 and 147 through pipe 34. Two output lines, 156 and 157, are connected to the amplifiers. Line 156 connects to a three-way valve 158 operated by solenoid 135. Output line 157 connects to a three-way valve 159 operated by solenoid 134. A pipe 160 connects valve 158 to air motors 161 and 162. Motor 161 operates valve 21 and motor 162 operates dampers 13 and 14. A pipe 163 connects valves 158 and 159. A pipe 164 connects valve 159 to a motor 165 which controls the operation of valve 18.

Smoke damper 25 is controlled by air motor 170. Motor 170 is connected through a pipe 171 and a valve 172 to air supply pipe 34. Valve 172 is controlled by solenoid 173 connected to wires 51 and 61.

Force balance pneumatic amplifiers 146 and 147 produce an air pressure in output lines 156 and 157 respectively, utilizing the supply air from pipe 34. The output pressure in pipe 156 is a function of the comparative air pressures in indicator lines 41 and 148. The air pressure in line 41 is controlled by the control stages. The air pressure in line 41 is controlled by the control stages. The air pressure in line 148 is controlled by valve 150. Amplifier 146 bleeds air (from pipe 34) into pipe 148 at a controlled rate. Air is bled off from pipe 148 by valve 150 at a rate that is a function of the temperature detected by wet bulb 151. Thus, at one temperature the air will be bled off faster through valve 150 than at another temperature, with the rate of bleedoff causing a corresponding change in the air pressure in line 148 so that the air pressure in line 148 is a function of the temperature detected by wet bulb 151. Similarly valve 152 controlled by dry bulb 153 bleeds off air from indicator line 149 to produce a pressure in line 149 that is a function of the temperature detected by the dry bulb. Amplifier 147 compares the air pressures in lines 47 and 149 and produces an output pressure in pipe 157 that is a function of the comparative pressures in the indicator lines. Such force balance amplifiers are commercially available items, as for example, the controller sold by Minneapolis Honeywell and designated by their model No. MH RP908B.

Gauges 38, 45, 97, 117, 77, 78, 101, 121, and 141 are calibrated in degrees of temperature Fahrenheit (or centigrade). Thus, for example, if 5 pounds pressure in indicator line 148 represented a reading of 175 degrees F. as detected by wet bulb 151, and if the amplifier were of a type in which equal input pressures produced a zero output signal (i.e. pressure), then gauge 38 would be calibrated to read 175 degrees F. when there was 5 pounds pressure in pipe 37. If, during the initial portion of a particular smokehouse operation, it was desired to have a particular wet bulb temperature and a particular dry bulb temperature, the wet bulb temperature would be set on gauge 38 by adjusting pressure regulating valve 36, and the dry bulb temperature would be set on gauge 45 by adjusting pressure regulating valve 43. Of course it is appreciated by those skilled in the art that the difference between the wet and dry bulb readings indicates the relative humidity. When valve 46 was opened by the energizing of solenoid 48 the air pressure in pipe 44 would be transmitted to pipe 47. If the dry bulb temperature in smokehouse 10 (as indicated by an air pressure in line 149) was below the desired temperature (as read on gauge 45) air would be supplied to motor 165 through pipe 157, valve 159 and pipe 164. This would open steam valve 18 to supply heat to the smokehouse through heat exchanger 15.

If, when valve 39 was opened by the energizing of solenoid 40, the wet bulb temperature as read at 151 and indicated by an air pressure in line 148 was below what was desired (as indicated by the air pressure in line 41), air under pressure would be supplied to pipe 156 by amplifier 146. If the difference between the pressures in lines 41 and 148 was relatively low, indicating that the humidity in smokehouse 10 was not very far from the desired amount, the air pressure in line 156 would be relatively low. Such relatively low pressures, e.g., 3 to 8 pounds, would be sufficient to operate motor 162 but inadequate to operate motor 161. Motor 162 would partially close dampers 13 and 14 with comparatively low pressures and, as the pressure increased towards 8 pounds, dampers 13 and 14 would be closed to an increasing extent. At 8 pounds the dampers 13 and 14 would be fully closed. If this was inadequate to supply the desired humidity in the smokehouse the situation would be signified by an ever increasing pressure in pipe 156. Thus, for example, when the pressure in pipe 156 increased to 10 pounds the valve 21 would be opened by motor 161 to admit live steam to the smokehouse through pipe 22. Greater pressures in pipe 156 would create a greater opening of valve 21 with the admission of more steam to the smokehouse.

Conversely, as the demand for humidity in the smokehouse became satisfied and the wet bulb temperature produced a pressure in line 48 more commensurate with the pressure in line 41 (called for by the setting of the pressure relief valve 36 and indicated on gauge 38), the initial result would be a gradual closing down of valve 21 so that less steam was introduced into the smokehouse. After valve 21 fully closed, and assuming that the humidity in the smokehouse more closely approached that called for, the next effect would be a gradual opening of dampers 13 and 14 by motor 162.

The pneumatic portions of control stages B, C, and D correspond to that of stage A. They would function the same as that previously described with respect to stage A. The timer apparatus, which will now be described in detail, serves to render the control stages effective in sequence. Thereby a different set of conditions, as established by the different settings of the pressure regulating valves of the successive stages, may be put into effect sequentially.

The timers 50, 65, 85, 105 and 125 are pre-set to operate for desired increments of time, which increments are not necessarily equal. After timer 50 ran out and the switches 56–59 return to the position illustrated in the drawing, switch 59 would supply power through wire 63 to timer 65. Assuming that timer 65 had been pre-set, the positions of switches 67–70 thereof all would be reversed from that illustrated. Since switch 70 would be open no current would be supplied to wire 84. Switch 67 would be closed and remain closed for the time period for which motor 66 was set to run. Switch 65 would energize solenoids 73 and 74 to open valves 75 and 76 thus dictating to amplifiers 146 and 147 the conditions to be established in smokehouse 10.

After timer 65 timed out, switch 70 would be closed to supply current to wire 84 and thus initiate the operation of timer 85 of control stage C. This would result in the opening of the valves 95 and 102 of control stage C to dictate to the amplifiers 146 and 147 what should be the then existing conditions in the smokehouse. Those conditions, of course, are predetermined by the settings of pressure regulating valves 98 and 99.

Upon timer 85 running out, switch 90 would be closed to energize timer 105, thus rendering control stage D effective. Control stage E is primarily intended to permit a steam cooking of the products in the smokehouse as the final step in the operation. Thus if switch 132 is closed, as illustrated, when timer 125 is energized through wire 124, current is supplied to solenoids 134 and 135 through switch 128 of timer 125. Solenoids 134 and 135, when energized, are effective to cause (in the illustrated drawing) a 90 degree clockwise rotation of the three-way valves 158 and 159. The rotation of valve 159 causes pipe 157 to be connected to pipe 163 (and disconnected from pipe 164). The rotation of valve 158 causes pipe 163 to be connected to pipe 160. The result is that amplifier 146 is rendered ineffective and the two motors, 161 and 162, are placed under the control of amplifier 147, and thus under the control of dry bulb thermostat 152, 153. So long as this dry bulb thermostat calls for heat to satisfy the setting of pressure regulating valve 140, as indicated on gauge 141, air under pressure is supplied to motors 161 and 162 from pipe 157. This results in a closing of dampers 13 and 14 and, assuming that a substantial additional degree of heat is demanded, the opening of valve 21 to supply steam to the smokehouse through pipe 22. Of course, if switch 132 were open the result would be that amplifier 147 would continue to control heat supplied to heat exchanger 15 in the manner previously described.

So long as switch 130 is open no current is supplied to wire 142; thus, solenoid 31 is deenergized and valve 30 is open. Similarly, indicator light 143 is dark. The same result would occur even though switch 130 was closed but with one or more of switches 53, 59, 70, 90 or 110 open. However, with all of these latter switches closed so that current is supplied to timer 125 through wire 124, solenoid 31 and light 143 will be energized upon the closing of switch 130. Thus when switch 130 closes at the end of the cycle (when timer 125 runs out) valve 30 will be opened by the energizing of solenoid 31 and light 43 will be lit to show the supervisor that the cycle has been completed.

If at any time during the cycle it is desired to add smoke from smoke generator 23 to the smokehouse 10 this can be done by closing one or more of switches 60, 71, 91 or 111. Thus, for example, if it is desired to add smoke during the period of time control stage A is effective, switch 60 would be closed when the cycle is being set up. During the period of time that motor 55 of timer 50 was running, switch 57 would be closed thus supplying current through switch 60 to wire 61. This would energize solenoid 173 to open valve 172 and supply air from pipe 34 to motor 170. Air motor 170, when supplied with air, would open damper 25 to permit smoke to enter the smokehouse.

In contrast, assume that it was desired to add smoke to the smokehouse only during the period of time that control stage D was effective. In that event the operator in setting up the cycle would leave switches 60, 71 and 91 open but close switch 111. During the periods of time that timers 50, 65 and 85 were running solenoid 173 would be deenergized. At that time current could not reach the solenoid through switch 111 because of one or more of switches 59, 70 and 90 being open. However, after all of timers 50, 65 and 85 had timed out, electricity would be supplied to timer 105 through wire 104. During the period of time that timer motor 106 was running switch 108 would be closed to supply electricity to solenoid 173 through switch 111.

During the period of time that smokehouse 10 was being emptied of its preceding load and filled with a new load of product to be processed, an operator would set up the cycle for the next operation of the smokehouse. Assuming that this cycle would be different from the preceding one, the operator, as for example working from a chart, would determine the periods of time during which the respective timers 50, 65, 85, 105 and 125 were to be effective. He would pre-set each of the timers for these periods of time. This, of course, would set the periods of time for which each control stages A–E were effective. He would then set the wet and dry bulb temperatures desired for each stage of the cycle. By adjusting regulating valves 36 and 43 he would set the wet and dry bulb temperatures of the smokehouse for the time that control stage A was to be effective. These temperatures would be read directly on gauges 38 and 45 respectively. Similarly by adjusting regulating valves 81 and 82 he would set the wet and dry bulb temperatures of the smokehouse for the period of time that control stages B was to be effective. Regulating valves 98 and 99 would be adjusted to predetermine the wet and dry bulb temperatures for control stage C and regulating valves 118 and 119 would be set to the desired temperatures for the time that control stage D was effective. Regulating valve 140 would be set to give a temperature reading on gauge 141 for the final steam cooking. Smoke control switches 60, 71, 91 and 111 would be open or closed depending upon the smoke requirements. Assuming that the smokehouse now is loaded with product, starting switch 53 is closed. At this point the operator is free to go about other duties and he need not return until the light 143 is lit indicating that the process has been completed.

The unusual flexibility of the control system is illustrated by the fact that it is even possible to change the processing cycle while it is in progress, in the middle of the stream so to speak. Thus, for example, assume that after control stage A had timed out and control stage B was in progress it was decided that the cooking should be carried to a higher dry bulb temperature than that previously set. The operator could at the time of making such determination increase the reading on gauge 121 by adjusting valve 119, increase the reading on gauge 101 by adjusting valve 99, and even increase the reading on gauge 78 by adjusting valve 82. Thus the whole shape of the heat application curve could be changed in the middle of the cycle. If at the same time the operator believed that the heat application should continue for an increased length of time, he could increase the settings on each of timer 65, 85, 105 and 125 to achieve the new desired total time.

Recorder 154 makes a constant record of the wet and dry bulb temperatures as indicated by thermostats 150, 151, and 152, 153. The pressure in line 148 adjusts the setting of one of the pens of recorder 154 and the pressure in line 149 controls the setting of the other pen in the recorder. Thus when the cycle is over (or even while it is in progress) the operator can tell just what was the effect in the smokehouse of the settings that were made for each of the control stages.

Actually, the heat application is in a step-by-step fashion although this will be smoothed out by a lag in bringing the house and contents up to a new temperature setting. Despite this fact the temperature increase in the food products will be an approximate gradual curve, under most smokehouse operating conditions.

I claim:

1. A control apparatus for use in controlling the conditions in a food smokehouse having first means to regulate the humidity and second means to supply heat, said apparatus comprising: a plurality of dual control stages each including wet bulb temperature control means and dry bulb temperature control means, said control means being adjustable and adapted to produce output signals which are respectively a function of the setting of the wet and dry bulb control means; adjustable timing means connected to said control stages for rendering the stages operative in a predetermined sequence and for determining the lengths of time that the control means of each stage produces said output signals; wet bulb temperature responsive means and dry bulb temperature responsive means for producing output signals which are respectively a function of the wet and dry bulb temperatures of said smokehouse; first actuating means connected to said first means, said wet bulb temperature control means and wet bulb temperature responsive means for actuating said first means as a function of the signals from the latter control and responsive means; and second actuating means connected to said second means, said dry bulb temperature control means and said dry bulb temperature responsive means for actuating said second means as a function of the signals from the latter control and responsive means.

2. An apparatus as set forth in claim 1, wherein said first means includes a live steam line entering said smokehouse to inject steam therein, and said first actuating means includes a valve in said steam line for controlling the flow of steam into said house; said apparatus including a single stage connected to said timing means to be rendered operative in a predetermined sequence with the dual stages, said single stage comprising only dry bulb temperature control means and being connected to said second actuating means; and means connected to said timing means, said first actuating means and said second actuating means to render said valve responsive to the wet bulb temperature when said dual stages are operative and to render the valve responsive to the dry bulb temperature when said single stage is rendered operative.

3. An apparatus as set forth in claim 2, wherein said first means includes intake and exhaust air dampers, and said first actuating means includes motor means connected to said dampers to operate the same, said actuating means being effective to close said dampers when said valve is open.

4. An apparatus as set forth in claim 1, wherein the smokehouse has a smoke generator communicating therewith with a damper in the communication duct and a motor control for said damper; said timing means comprising an individual timer for each of said stages, said timers being interconnected so as to be rendered operative in a predetermined sequence; said apparatus including means connecting said timers and said motor to selectively render said motor effective to open said damper and supply smoke to the smokehouse when a selected one of the timers is operative.

5. An apparatus as set forth in claim 1 for use with a source of air under pressure, and wherein each control means includes an adjustable pressure regulating valve connected to said source, an on-off valve connecting said pressure regulating valve and the respective actuating means and a temperature calibrated pressure gauge connected between the two valves, said on-off valve being connected to the timing means to be opened when the respective stage is to be operative; whereby the output signal of the stage is an air pressure value determined by the setting of the regulating valve and indicated on the gauge which signal is transmitted to the actuating means when the on-off valve is opened.

6. An apparatus as set forth in claim 5, wherein the actuating means are force balance pneumatic amplifiers connected to said source of air and producing an output signal in the form of air under pressure, which pressure is a function of the input signals, a conduit connecting the actuating means and the respective pressure responsive means, said actuating means also feeding air at a given rate to the respective responsive means through said conduit, said responsive means including a bleeder valve whose setting is a function of the temperature ascertained by the respective responsive means to form an input signal to the amplifier as a pressure value in said conduit.

7. An apparatus as set forth in claim 6 for use with a source of electrical power, wherein each control means includes a solenoid valve operator for each of the on-off valves and connected to the respective on-off valve, said timing means including a separate timer for each stage, each timer including driving means and switches actuated by the driving means, said timers being individually setable from zero to run for a predetermined length of time, one switch of each timer being normally open and being closed when the setting of the timer is displaced from the zero position, said one switch of each timer being connected in series with said source of power and the valve operator of the respective stage.

8. An apparatus as set forth in claim 7, wherein said first means includes a live steam line entering said smokehouse to inject steam therein, and said first actuating means includes a valve in said steam line for controlling the flow of steam into said house; said apparatus including a single stage connected to said timing means to be rendered operative in a predetermined sequence with the dual stages, said single stage comprising only dry bulb temperature control means and being connected to said second actuating means; and means connected to said timing means, said first actuating means and said second actuating means to render said steam valve responsive to the wet bulb temperature when said dual stages are operative and to render the steam valve responsive to the dry bulb temperature when said single stage is rendered operative.

9. An apparatus as set forth in claim 8, wherein the smokehouse has a smoke generator communicating therewith a damper in the communication duct and a motor control for said damper; said apparatus including means connecting said timers and said motor to selectively render said motor effective to open said damper and supply smoke to the smokehouse when a selected one of the timers is operative; said first means includes intake and exhaust air dampers, and said first actuating means includes motor means connected to said dampers to operate the same, said actuating means being effective to close said dampers when said steam valve is open.

10. An apparatus as set forth in claim 1, wherein said adjustable timing means includes a plurality of electrical timers, one for each of said control stages, each timer being individually adjustable and actuating a plurality of switches, said timers being interconnected so that as each timer times out it energizes the timer of the succeeding control stage, said apparatus including a manually operable switch connected to the time of the initial control stage to energize that timer, said first and second actuating means each comprising an amplifier having two inputs and an output, said inputs being connected to the control means and to the responsive means respectively, said first and second means including motors connected respectively to said outputs.

References Cited

UNITED STATES PATENTS

| | | | |
|---|---|---|---|
| 2,260,266 | 10/1941 | Simon | 236—46 |
| 3,043,517 | 7/1962 | Hanna | 236—46 |
| 2,312,339 | 3/1943 | Jones | 99—259 |
| 2,605,969 | 8/1952 | Sanders | 236—46 |
| 3,038,663 | 6/1962 | Flores | 236—46 |
| 3,199,436 | 8/1965 | Rasmussen et al. | 99—259 |
| 3,301,481 | 1/1967 | Amy et al. | 236—46 |
| 3,311,303 | 3/1967 | Noyes | 236—46 |
| 3,329,341 | 7/1967 | Jones | 236—46 |

WALTER A. SCHEEL, *Primary Examiner.*

J. M. NEARY, *Assistant Examiner.*

U.S. Cl. X.R.

236—44, 46; 99—333.

PO-1050
(5/69)

UNITED STATES PATENT OFFICE
CERTIFICATE OF CORRECTION

Patent No. 3,440,950      Dated April 29, 1969

Inventor(s) LeRoy G. Moskal

It is certified that error appears in the above-identified patent and that said Letters Patent are hereby corrected as shown below:

Column 1, line 29, "therdeof" should read --thereof--. Column 2, line 12, "invention" should read --inventive--. Column 4, lines 24-25, delete the sentence "The air pressure in line 41 is controlled by the control stages." Column 6, line 32, after "time" insert --that--; column 6, line 63, after "each" insert --of--; column 6, line 73, "stages" should read --stage--. Column 9, line 8, after "with" insert --with--; column 9, line 25, "time" should read --timer--.

SIGNED AND
SEALED

SEP 2 - 1969

(SEAL)
Attest:

Edward M. Fletcher, Jr.
Attesting Officer

WILLIAM E. SCHUYLER, JR.
Commissioner of Patents